United States Patent
Kim et al.

(10) Patent No.: US 10,788,729 B2
(45) Date of Patent: Sep. 29, 2020

(54) LASER BEAM PHASE-MODULATION DEVICE, LASER BEAM STEERING DEVICE AND LASER BEAM STEERING SYSTEM INCLUDING THE SAME

(71) Applicant: SAMSUNG ELECTRONICS CO., LTD., Suwon-si (KR)

(72) Inventors: Sunil Kim, Osan-si (KR); Changgyun Shin, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/670,509

(22) Filed: Aug. 7, 2017

(65) Prior Publication Data

US 2018/0136542 A1 May 17, 2018

(30) Foreign Application Priority Data

Nov. 15, 2016 (KR) .......................... 10-2016-0152234

(51) Int. Cl.
| | | |
|---|---|---|
| G02F 1/035 | (2006.01) | |
| G02B 6/12 | (2006.01) | |
| G02B 6/10 | (2006.01) | |
| G02F 1/35 | (2006.01) | |
| G02B 6/122 | (2006.01) | |
| G02B 6/28 | (2006.01) | |
| G02B 6/35 | (2006.01) | |

(Continued)

(52) U.S. Cl.
CPC .......... *G02F 1/3515* (2013.01); *G02B 6/1226* (2013.01); *G02B 6/2848* (2013.01); *G02B 6/3524* (2013.01); *G02F 1/011* (2013.01); *G02F 1/0102* (2013.01); *G02F 1/0356* (2013.01); *G02F 1/365* (2013.01)

(58) Field of Classification Search
CPC .......... G02F 1/035; G02F 1/011; G02F 1/365; G02F 1/3515; G02F 1/0356
USPC ........................................ 385/3, 14, 129–132
See application file for complete search history.

(56) References Cited

U.S. PATENT DOCUMENTS

2007/0018077 A1\* 1/2007 Puscasu .................... G01J 1/42
250/210
2010/0301971 A1\* 12/2010 Yonak ................ H01P 1/20381
333/219.1

(Continued)

FOREIGN PATENT DOCUMENTS

| KR | 10-2015-0090035 A | 8/2015 |
| KR | 10-1564285 B1 | 10/2015 |

*Primary Examiner* — Kaveh C Kianni
*Assistant Examiner* — Hung Q Lam
(74) *Attorney, Agent, or Firm* — Sughrue Mion, PLLC

(57) ABSTRACT

A laser beam phase-modulation device, a laser beam steering device, and a laser beam steering system including the same are provided. The laser beam phase-modulation device includes a refractive index conversion layer having a refractive index that is changed according to an electrical signal applied thereto, the refractive index conversion layer including an upper surface on which the laser beam is incident and a lower surface opposite the upper surface, at least one antenna pattern embedded in the upper surface of the refractive index conversion layer, and a metal mirror layer provided under the lower surface of the refractive index conversion layer and configured to reflect the laser beam.

14 Claims, 3 Drawing Sheets

(51) Int. Cl.
*G02F 1/01* (2006.01)
*G02F 1/365* (2006.01)

(56) References Cited

U.S. PATENT DOCUMENTS

| | | | |
|---|---|---|---|
| 2012/0170097 A1* | 7/2012 | Han | B82Y 20/00 |
| | | | 359/238 |
| 2014/0211298 A1* | 7/2014 | Sayyah | H01P 7/082 |
| | | | 359/298 |
| 2014/0301694 A1 | 10/2014 | Lee et al. | |
| 2015/0378183 A1 | 12/2015 | Pernice et al. | |
| 2016/0241321 A1 | 8/2016 | Agardh | |

* cited by examiner

LASER BEAM PHASE-MODULATION DEVICE, LASER BEAM STEERING DEVICE AND LASER BEAM STEERING SYSTEM INCLUDING THE SAME

CROSS-REFERENCE TO RELATED APPLICATION

This application claims priority from Korean Patent Application No. 10-2016-0152234, filed on Nov. 15, 2016, in the Korean Intellectual Property Office, the disclosure of which is incorporated herein in its entirety by reference.

BACKGROUND

1. Field

Apparatuses and methods consistent with example embodiments relate to a laser beam phase-modulation device, a laser beam steering device, and a laser beam steering system including the same.

2. Description of the Related Art

In order to steer a beam such as a laser to a desired position, a method of mechanically rotating a laser-irradiated portion has been used, as well as a method of using an interference of a laser beam bundle from several pixels or waveguides by using an Optical Phased Array (OPA) method. In the OPA method, a laser beam may be steered by electrically or thermally controlling unit cells or waveguides.

In order to mechanically drive a laser beam, a motor or a micro-electro-mechanical system (MEMS) structure must be applied. However, in this case, the volume of the entire device becomes large, and the cost of parts may increase. In addition, noise may occur when a motor is applied, and application of the MEMS structure to various parts may be limited due to vibrations and the like.

SUMMARY

Example embodiments provide a laser beam phase-modulation device, a laser beam steering device, and a laser beam steering system including the same.

According to an aspect of an example embodiment, there is provided a device configured to modulate a phase of a laser beam, the device including: a refractive index conversion layer having a refractive index that changes according to an electrical signal applied thereto, the refractive index conversion layer including an upper surface on which the laser beam is incident and a lower surface opposite the upper surface; at least one antenna pattern embedded in the upper surface of the refractive index conversion layer; and a metal mirror layer provided under the lower surface of the refractive index conversion layer and configured to reflect the laser beam.

The at least one antenna pattern may have an upper surface, a lower surface, and side surfaces, and the refractive index conversion layer may be provided on the side surfaces and the lower surface of the at least one antenna pattern.

The at least one antenna pattern may have an upper surface, a lower surface, and side surfaces, and the refractive index conversion layer may be provided on the side, lower, and upper surfaces of the at least one antenna pattern.

The device may further include an insulating layer provided between the upper surface of the refractive index conversion layer and the at least one antenna pattern.

The insulating layer may include at least one of silicon dioxide ($SiO_2$), silicon nitride ($Si_3N_4$), aluminum oxide ($Al_2O_3$), hafnium dioxide ($HfO_2$), hafnium silicon dioxide ($HfSiO_2$), and zirconium dioxide ($ZrO_2$).

The refractive index conversion layer may include an oxide semiconductor.

The oxide semiconductor may include at least one of Indium-Tin-Oxide (ITO), Indium-Zinc-Oxide (IZO), Ga—In—Zn-Oxide (GIZO), Al—Zn-Oxide (AZO), Ga—Zn-Oxide (GZO), and ZnO.

The at least one antenna pattern may include at least one of silver (Ag), gold (Au), aluminum (Al), platinum (Pt), titanium nitride (TiN), and tantalum nitride (TaN).

According to an aspect of another example embodiment, there is provided a device configured to steer a laser beam, the device including: a plurality of unit cells, each of the unit cells including: a refractive index conversion layer having a refractive index that changes according to an electrical signal applied thereto, the refractive index conversion layer including an upper surface on which the laser beam is incident and a lower surface opposite the upper surface; at least one antenna pattern embedded in the upper surface of the refractive index conversion layer; a metal mirror layer provided under the lower surface of the refractive index conversion layer and configured to reflect the laser beam; and a unit cell driver configured to apply the electrical signal to the refractive index conversion layer.

The at least one antenna pattern may have an upper surface, a lower surface, and side surfaces, and the refractive index conversion layer may be provided on the side surfaces and the lower surface of the at least one antenna pattern.

The at least one antenna pattern may have an upper surface, a lower surface, and side surfaces, and the refractive index conversion layer may be provided on the side, bottom, and upper surfaces of the at least one antenna pattern.

The plurality of unit cells may be arranged two-dimensionally.

The plurality of unit cells may be configured to steer the laser beam by forming a refractive index profile that changes with time.

The device may further include an insulating layer provided between the refractive index conversion layer and the at least one antenna pattern.

According to an aspect of another example embodiment, there is provided a laser beam steering system including: a laser light source configured to emit a laser beam; a laser beam steering device configured to steer the laser beam incident from the laser light source; and a detector configured to detect the steered laser beam, wherein the laser beam steering device includes: a plurality of unit cells, each of the unit cells including: a refractive index conversion layer having a refractive index that changes according to an electrical signal applied thereto, the refractive index conversion layer including an upper surface on which the laser beam is incident and a lower surface opposite the upper surface; at least one antenna pattern embedded in the upper surface of the refractive index conversion layer; a metal mirror layer provided under the lower surface of the refractive index conversion layer and configured to reflect the laser beam; and a unit cell driver configured to apply the electrical signal to the refractive index conversion layer.

The at least one antenna pattern may have an upper surface, a lower surface, and side surfaces, and the refractive index conversion layer may be provided on the side surfaces and the lower surface of the at least one antenna pattern.

The at least one antenna pattern may have an upper surface, a lower surface, and side surfaces, and the refractive index conversion layer may be provided on the side, lower, and upper surfaces of the at least one antenna pattern.

The plurality of unit cells may be arranged two-dimensionally.

The plurality of unit cells may be configured to steer the laser beam by forming a refractive index profile that changes with time.

The laser beam steering system may further include an insulating layer provided between the refractive index conversion layer and the at least one antenna pattern.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
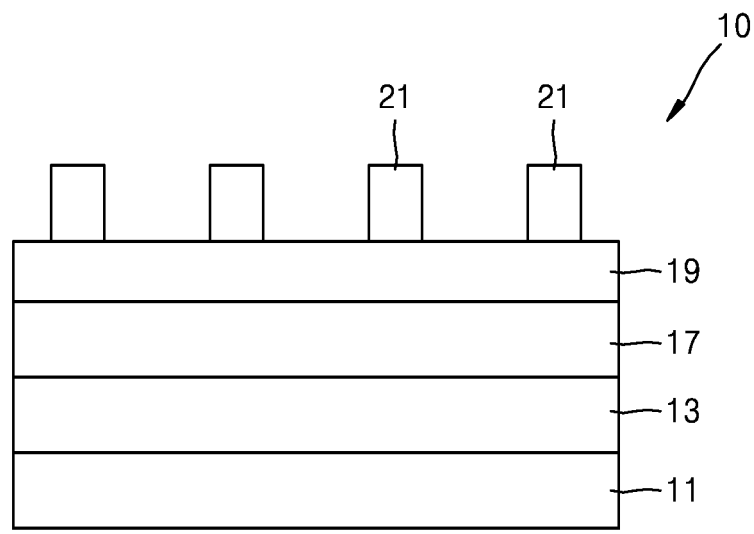
FIG. 1 is a cross-sectional view of a laser beam steering device.

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, by referring to the figures, to explain aspects. Expressions such as "at least one of," when preceding a list of elements, modify the entire list of elements and do not modify the individual elements of the list.

Throughout the specification, it will be understood that when a unit is referred to as being "connected" to another element, the unit may be "directly connected" to the other element or "electrically connected" to the other element in a state in which intervening elements are present.

FIG. 1 is a cross-sectional view of a general laser beam steering device 10.

Referring to FIG. 1, a plurality of antenna patterns 21 are provided over an upper portion of a refractive index conversion layer 17 having a refractive index that is converted by an electrical signal. A metal mirror layer 13 is provided under the refractive index conversion layer 17 and a unit cell driver 11 is provided under the metal mirror layer 13. An insulating layer 19 is provided between the refractive index conversion layer 17 and the antenna patterns 21. In such a structure, when a voltage is applied to the refractive index conversion layer 17 by the unit cell driver 11, a carrier density of the refractive index conversion layer 17 changes, and thus, a refractive index is changed.

Figure 2:
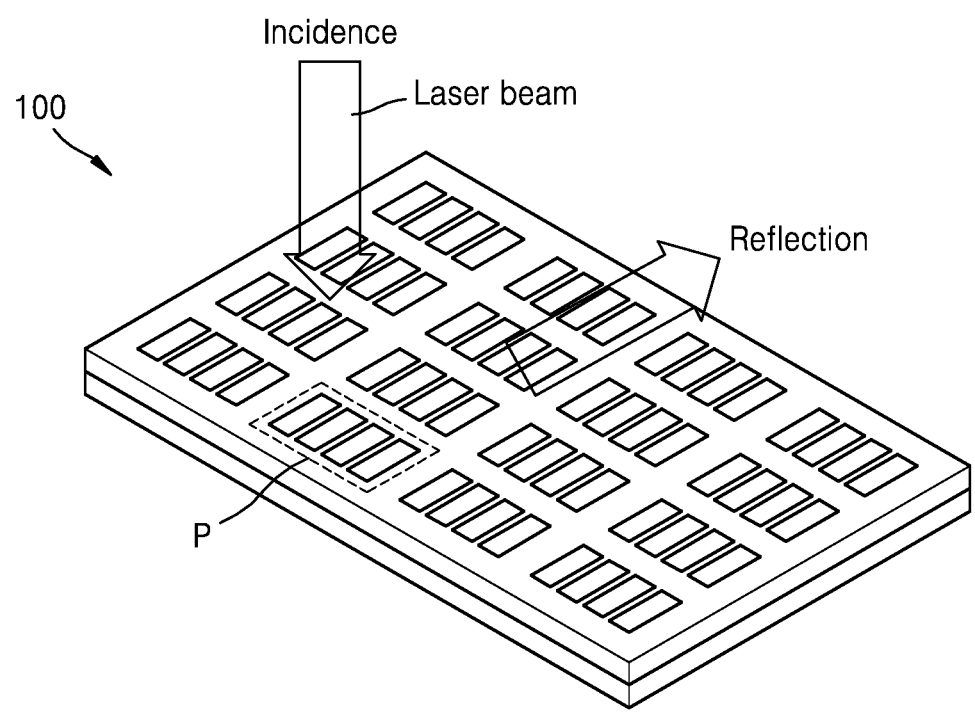
FIG. 2 is a perspective view of a laser beam steering device according to an example embodiment.

FIG. 2 is a perspective view of a laser beam steering device 100 according to an example embodiment.

Referring to FIG. 2, the laser beam steering device 100 may include a plurality of unit cells P arranged in a two-dimensional (2D) form. Each of the unit cells P has a predetermined refractive index, so that the unit cells P may form a refractive index profile. The plurality of unit cells P may form a refractive index profile that changes with time, thereby steering a laser beam incident on the laser beam steering device 100 in a desired direction.

Figure 3:
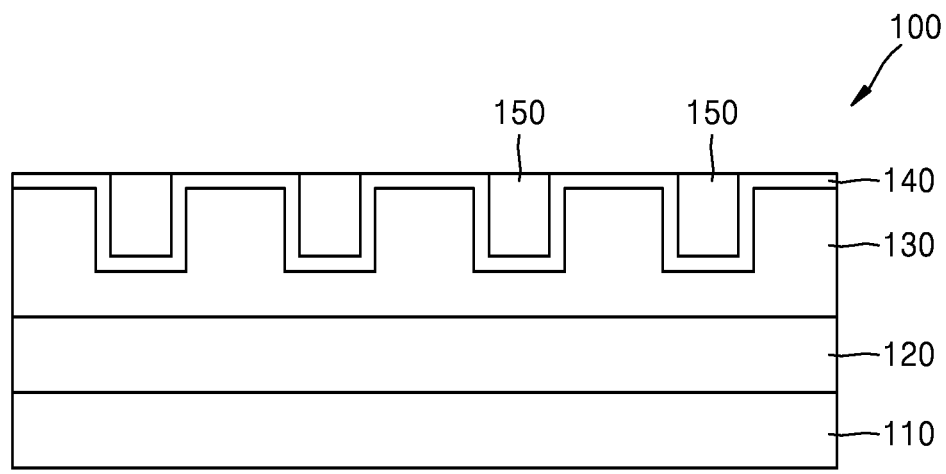
FIG. 3 is a cross-sectional view of a unit cell of a laser beam steering device according to an example embodiment.

FIG. 3 is a cross-sectional view of a unit cell P of the laser beam steering device 100 according to an example embodiment.

Referring to FIG. 3, the unit cell P of the laser beam steering device 100 may include a refractive index conversion layer 130, a plurality of antenna patterns 150 embedded in the refractive index conversion layer 130, a metal mirror layer 120 provided under the refractive index conversion layer 130, and a unit cell driver 110 for applying an electrical signal to the refractive index conversion layer 130.

A carrier density of the refractive index conversion layer 130 may change depending on the application of an electrical signal (e.g., a voltage) thereto. The change of the carrier density may change a refractive index of the refractive index conversion layer 130, and the laser beam may be steered according to the change of the refractive index.

The refractive index conversion layer 130 may include a material in which a carrier density thereof varies with a voltage applied thereto. For example, the refractive index conversion layer 130 may include an oxide semiconductor. As a specific example, the refractive index conversion layer 130 may include a transparent conductive oxide (TCO). The TCO may be, for example, Indium-Tin-Oxide (ITO), Indium-Zinc-Oxide (IZO), Ga—In—Zn-Oxide (GIZO), Al—Zn-Oxide (AZO), or Ga—Zn-Oxide (ZnO), but embodiments are not limited thereto.

In general, since refractive index conversion efficiency improves as a carrier density is increased, the refractive index conversion layer 130 may include a material having a high carrier density. As such, when the refractive index conversion layer 130 has a high carrier density, the maximum phase of a laser beam may increase as the refractive index conversion efficiency is improved.

The refractive index conversion layer 130 may be formed to be relatively thin so as not to affect a wavelength of a laser beam incident thereon. For example, the refractive index conversion layer 130 may have a thickness of about 5 nm or less. However, the refractive index conversion layer 130 is not limited thereto, and the refractive index conversion layer 130 may have various thicknesses.

The plurality of antenna patterns 150 are embedded in the refractive index conversion layer 130. For example, the refractive index conversion layer 130 may be provided on side surfaces and a bottom surface of each of the plurality of antenna patterns 150. Alternatively, the refractive index conversion layer 130 may be provided on at least two sides of each of the plurality of antenna patterns 150. FIG. 3 shows an example in which four antenna patterns are provided corresponding to one unit cell P, as an example. However, embodiments are not limited thereto, and the plurality of antenna patterns 150 may be provided corresponding to one unit cell P.

The plurality of antenna patterns 150 may be provided to form a metasurface for beam steering. Here, the antenna patterns 150 may include, for example, a metal or an alloy including at least one of silver (Ag), gold (Au), aluminum (Al), and platinum (Pt). In addition, the antenna patterns 150 may include a metal nitride such as titanium nitride (TiN) or tantalum nitride (TaN). However, the above-mentioned materials are merely examples, and the antenna patterns 150 may include various materials.

FIG. 2 shows an example in which the antenna patterns 150 have a rectangular shape in which the antenna patterns 150 are arranged at regular intervals. However, embodiments are not limited thereto, and the antenna patterns 150 may have various shapes. For example, the antenna patterns 150 may have a polygonal shape including a circle, an ellipse, a triangle, or a square. In addition, the antenna patterns 150 may have irregular shapes.

A distance between the antenna patterns 150 may be less than, for example, ½ or ⅓ of a wavelength of a laser beam incident thereon. For example, when the wavelength of the laser beam incident thereon is 1500 nm, an interval between the antenna patterns 150 may be 500 nm or less. However, embodiments are not limited thereto. Furthermore, although the antenna patterns 150 may be arranged at regular intervals, embodiments are not limited thereto. The antenna patterns 150 may be arranged at irregular intervals.

An insulating layer 140 may be provided between the refractive index conversion layer 130 and the antenna patterns 150. The insulating layer 140 may include various kinds of insulating materials. For example, the insulating layer 140 may include an insulating material having resistance of at least 1 MΩ. As a specific example, the insulating layer 140 may include, but is not limited to including, silicon oxide, silicon nitride, aluminum oxide ($Al_2O_3$), zinc oxide ($ZrO_2$), or hafnium oxide ($HfO_2$).

The metal mirror layer 120 may be provided on a lower surface of the refractive index conversion layer 130. The metal mirror layer 120 may be provided to improve light efficiency of the laser beam steering device 100 by reflecting a laser beam incident thereon. The metal mirror layer 120 may include, for example, a same metal material as that of the antenna patterns 150. As a specific example, the metal mirror layer 120 may include at least one of Ag, Au, Al, and Pt. However, embodiments are not limited thereto, and the metal mirror layer 120 may include a metal material different from that of the antenna patterns 150.

The metal mirror layer 120 may also function as an electrode for applying a voltage to the refractive index conversion layer 130. For example, when a voltage is applied between the metal mirror layer 120 and the antenna patterns 150 by the unit cell driver 110, a carrier density of the refractive index conversion layer 130 changes, and therefore, a refractive index of the light guide plate 130 may be changed.

The unit cell driver 110 may apply an electrical signal, such as a voltage, to the refractive index conversion layer 130. The unit cell driver 110 may be provided under the metal mirror layer 120. The unit cell driver 110 includes, for example, one transistor and one capacitor to apply a voltage to the refractive index conversion layer 130 in the unit cell P. The unit cell driver 110 may apply a voltage between the antenna patterns 150 and the metal mirror layer 120 or may apply a voltage between the antenna patterns 150 and the refractive index conversion layer 130.

The plurality of unit cells P are independently driven by corresponding unit cell drivers 110, thereby exhibiting different refractive indexes, and thus a refractive index profile of the plurality of unit cells P may be formed. Since the refractive index profile may be changed by changing a voltage applied to the unit cells P, the laser beam may be steered in a desired direction.

The laser beam steering device 100 having the above structure may ensure a maximum phase change even at a low driving voltage by configuring the antenna patterns 150 to be embedded in the refractive index conversion layer 130, and thus, stability of the steering device 100 may be improved.

Figure 4:
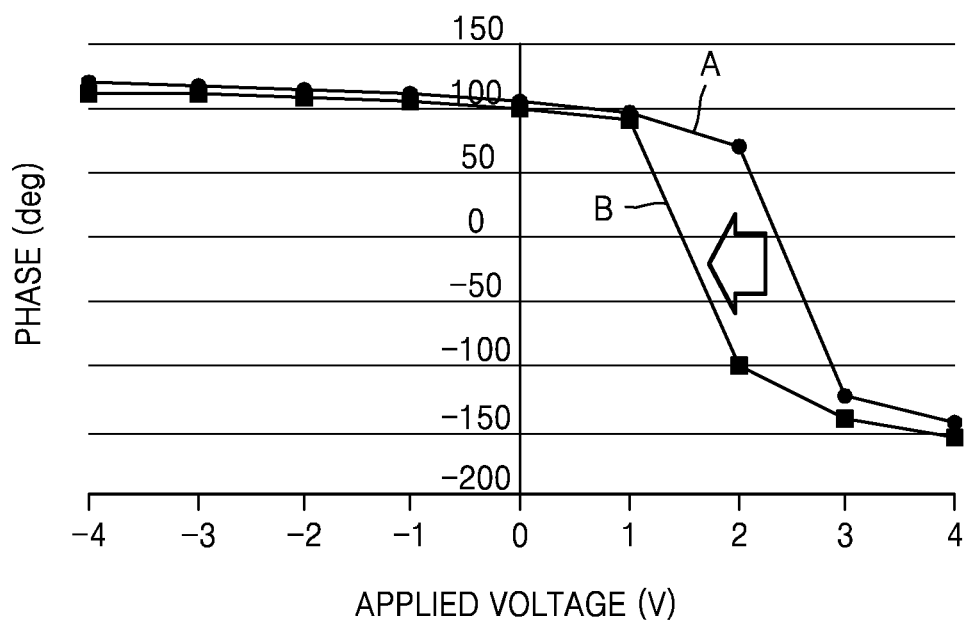
FIG. 4 is a graph illustrating finite-difference time-domain (FDTD) simulation results of a phase according to an applied voltage in a general laser beam steering device A and a laser beam steering device B according to an example embodiment.

FIG. 4 is a graph illustrating finite-difference time-domain (FDTD) simulation results of a phase according to an applied voltage in a general laser beam steering device A and a laser beam steering device B according to an exemplary embodiment. In FIG. 4, the general laser beam steering device A has the sectional structure of FIG. 1, and the laser beam steering device B according to the exemplary embodiment has the sectional structure of FIG. 3. ITO is used for the refractive index conversion layer 17 in the general laser beam steering device A and also used for the refractive index conversion layer 130 in the laser beam steering device B according to an example embodiment.

Referring to FIG. 4, the laser beam steering device B according to an example embodiment applies a voltage of about 2V to obtain a phase change of about 200 degrees, and the general laser beam steering device A applies a voltage of about 3V to obtain a phase change of about 200 degrees. That is, it can be seen that the laser beam steering device B according to an example embodiment may secure a high phase change with a low applied voltage as compared with the general laser beam steering device A. Therefore, the laser beam steering device B according to an example embodiment may realize a high phase change even at a low driving voltage, and the low driving voltage may improve stability of the laser beam steering device B.

Figure 5:
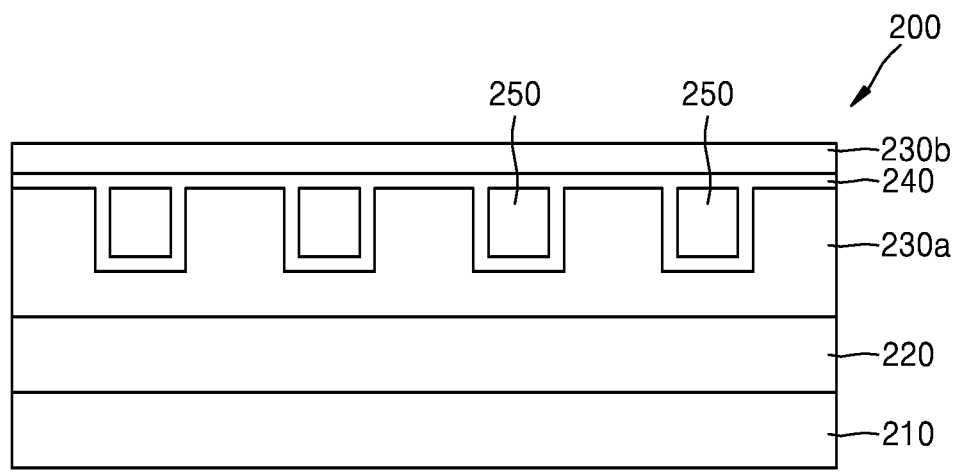
FIG. 5 is a cross-sectional view of a laser beam steering device according to another example embodiment.

FIG. 5 is a cross-sectional view of a laser beam steering device 200 according to another example embodiment. FIG. 5 shows one unit cell among a plurality of unit cells constituting the laser beam steering device 200.

Referring to FIG. 5, a unit cell of the laser beam steering device 200 includes refractive index conversion layers 230a and 230b in which carrier densities thereof vary according to an electrical signal, a plurality of antenna patterns 250 embedded in the refractive index conversion layers 230a and 230b, a metal mirror layer 220 provided under the refractive index conversion layer 230a, and a unit cell driver 210 for applying an electrical signal to the refractive index conversion layers 230a and 230b. Furthermore, an insulating layer 240 may be provided between the refractive index conversion layers 230a and 230b and the antenna patterns 250.

The refractive index conversion layers 230a and 230b may include a material in which a carrier density thereof varies with a voltage applied thereto. For example, the refractive index conversion layers 230a and 230b may include an oxide semiconductor such as a TCO or the like. However, embodiments are not limited thereto. The refractive index conversion layers 230a and 230b may be formed to have a relatively thin thickness of about 5 nm or less so as not to affect a wavelength of a laser beam incident thereon.

The plurality of antenna patterns 250 are embedded in the refractive index conversion layers 230a and 230b. For example, the refractive index conversion layers 230a and 230b may be provided on left side, right side, lower, and upper surfaces of each of the plurality of antenna patterns 250. Alternatively, the refractive index conversion layers 230a and 230b may be provided on at least three sides of each of the plurality of antenna patterns 250. The antenna patterns 250 may include, for example, a metal or an alloy including at least one of Ag, Au, Al, and Pt. In addition, the antenna patterns 250 may include a metal nitride such as TiN or TaN. The distance between the antenna patterns 250 may be less than, for example, ½ or ⅓ of a wavelength of a laser beam incident thereon.

The insulating layer 240 may be provided between the refractive index conversion layers 230a and 230b and the antenna patterns 250. The insulating layer 240 may include, for example, an insulating material having resistance of at least 1 MΩ. As a specific example, the insulating layer 240 may include, but is not limited to, silicon oxide, silicon nitride, $Al_2O_3$, $ZrO_2$, or $HfO_2$.

The metal mirror layer 220 may be provided on a lower surface of the refractive index conversion layer 230a. For example, the metal mirror layer 220 may include, but is not limited to including, a same metal material as that of the antenna patterns 250. The metal mirror layer 220 may also function as an electrode for applying a voltage to the refractive index conversion layers 230a and 230b.

The unit cell driver 210 may apply an electrical signal, such as a voltage, to the refractive index conversion layers 230a and 230b. The unit cell driver 210 may be provided under the metal mirror layer 220. The unit cell driver 210 may apply a voltage between the antenna patterns 250 and the metal mirror layer 220 or may apply a voltage between the metal mirror layer 220 and the refractive index conversion layers 230a and 230b, thereby controlling a carrier density of the conversion layers 230a and 230b.

A maximum phase change even at a low driving voltage may be ensured in the laser beam steering device 200 having the above structure due to having a configuration in which the antenna patterns 250 are embedded in the refractive index conversion layers 230a and 230b, and thus, stability of the steering device 200 may be improved.

Figure 6:
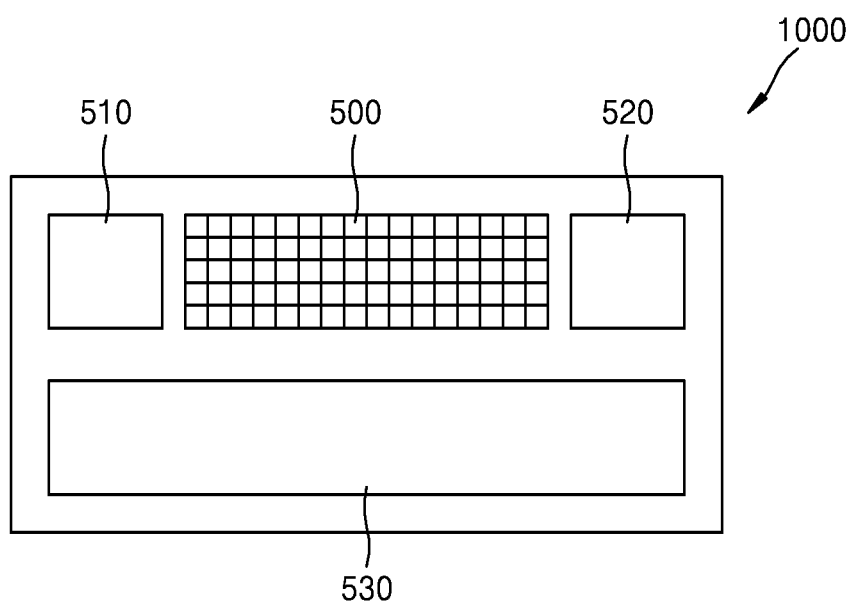
FIG. 6 is a view of a laser beam steering system according to another example embodiment.

FIG. 6 is a view of a laser beam steering system 1000 according to another example embodiment. FIG. 6 schematically illustrates the laser beam steering system 1000 to which the laser beam steering device according to the example embodiments described above may be applied.

Referring to FIG. 6, the laser beam steering system 1000 according to an example embodiment may include a laser light source 510 which emits a laser beam, a laser beam steering device 500 which steers the laser beam, a detector 520 which detects the steered laser beam, and a driver 530. The driver 530 may include a driving circuit for driving the laser light source 510, the laser beam steering device 500, and the detector 520.

For example, a laser diode may be used as the laser light source 510. However, this is merely an example and various other types of light sources may be used. The laser beam emitted from the laser light source 510 is incident on the laser beam steering device 500. The laser beam steering device 500 steers the laser beam incident thereon to a desired position. The laser beam steering device 500 may include the laser beam steering devices 100 and 200 according to the above-described exemplary embodiments. In addition, when the laser beam steered by the laser beam steering device 500 is irradiated to an object and is reflected, the detector 520 may detect the reflected laser beam. The laser beam steering system 1000 having the laser beam steering device 500 may have various applications, such as in a depth sensor, a 3D sensor, or light detection and ranging (LiDAR).

As described above, according to the example embodiments, an area of a refractive index conversion layer for driving antenna patterns may be increased. In more detail, a laser beam steering device has a structure in which antenna patterns are embedded in a refractive index conversion layer, so that when a laser beam incident on the antenna patterns is reflected, influence of the refractive index conversion layer on the laser beam may increase. Also, the laser beam steering device according to the example embodiments may ensure a maximum phase change even at a low driving voltage, and the low driving voltage may improve stability of the laser beam steering device.

It should be understood that the example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A device for modulating a phase of a laser beam, the device comprising:
   a refractive index conversion layer having a refractive index that changes according to an electrical signal applied thereto, the refractive index conversion layer comprising an upper surface on which the laser beam is incident and a lower surface opposite the upper surface;
   at least one antenna pattern embedded in the upper surface of the refractive index conversion layer;
   an insulating layer disposed between the refractive index conversion layer and the at least one antenna pattern; and
   a metal mirror layer provided under the lower surface of the refractive index conversion layer and configured to reflect the laser beam;
   wherein the at least one antenna pattern has an upper surface, a lower surface, and side surfaces,
   wherein the refractive index conversion layer is provided on the side surfaces and the lower surface of the at least one antenna pattern, and
   wherein the insulating layer is disposed to cover the lower surface, the upper surface, and the side surfaces of the at least one antenna pattern.

2. A device for modulating a phase of a laser beam, the device comprising:
   a refractive index conversion layer having a refractive index that changes according to an electrical signal applied thereto, the refractive index conversion layer comprising an upper surface on which the laser beam is incident and a lower surface opposite the upper surface;
   at least one antenna pattern embedded in the upper surface of the refractive index conversion layer; and
   a metal mirror layer provided under the lower surface of the refractive index conversion layer and configured to reflect the laser beam;
   wherein the at least one antenna pattern has an upper surface, a lower surface, and side surfaces, and
   wherein the refractive index conversion layer is provided on the side surfaces, the lower surface, and the upper surface of the at least one antenna pattern.

3. The device of claim 1, wherein the insulating layer comprises at least one of silicon dioxide ($SiO_2$), silicon nitride ($Si_3N_4$), aluminum oxide ($Al_2O_3$), hafnium dioxide ($HfO_2$), hafnium silicon dioxide ($HfSiO_2$), and zirconium dioxide ($ZrO_2$).

4. The device of claim 1, wherein the refractive index conversion layer comprises an oxide semiconductor.

5. The device of claim 4, wherein the oxide semiconductor comprises at least one of Indium-Tin-Oxide (ITO), Indium-Zinc-Oxide (IZO), Ga—In—Zn—Oxide (GIZO), Al—Zn-Oxide (AZO), Ga—Zn-Oxide (GZO), and ZnO.

6. The device of claim 1, wherein the antenna pattern comprises at least one of silver (Ag), gold (Au), aluminum (Al), platinum (Pt), titanium nitride (TiN), and tantalum nitride (TaN).

7. A device for steering a laser beam, the device comprising:
   a plurality of unit cells, each of the unit cells comprising:
      a refractive index conversion layer having a refractive index that changes according to an electrical signal applied thereto, the refractive index conversion layer comprising an upper surface on which the laser beam is incident and a lower surface opposite the upper surface;
      at least one antenna pattern embedded in the upper surface of the refractive index conversion layer;
      a metal mirror layer provided under the lower surface of the refractive index conversion layer and configured to reflect the laser beam; and
      a unit cell driver configured to apply the electrical signal to the refractive index conversion layer;
   wherein the at least one antenna pattern has an upper surface, a lower surface, and side surfaces, and
   the refractive index conversion layer is provided on the side surfaces, the lower surface, and the upper surface of the at least one antenna pattern.

8. The device of claim 7, wherein the plurality of unit cells are arranged two-dimensionally.

9. The device of claim 8, wherein the plurality of unit cells are configured to steer the laser beam by forming a refractive index profile that changes with time.

10. The device of claim 7, further comprising an insulating layer provided between the refractive index conversion layer and the at least one antenna pattern.

11. A laser beam steering system comprising:
   a laser light source configured to emit a laser beam;
   a laser beam steering device configured to steer the laser beam incident from the laser light source; and
   a detector configured to detect the steered laser beam, wherein the laser beam steering device comprises:
   a plurality of unit cells, each of the plurality of unit cells comprising:
      a refractive index conversion layer having a refractive index that changes according to an electrical signal applied thereto, the refractive index conversion layer comprising an upper surface on which the laser beam is incident and a lower surface opposite the upper surface;
      at least one antenna pattern embedded in the upper surface of the refractive index conversion layer;
      a metal mirror layer provided under the lower surface of the refractive index conversion layer and configured to reflect the laser beam; and
      a unit cell driver configured to apply the electrical signal to the refractive index conversion layer;
   wherein the at least one antenna pattern has an upper surface, a lower surface, and side surfaces, and
   the refractive index conversion layer is provided on the side surfaces, the lower surface, and the upper surface of the at least one antenna pattern.

12. The laser beam steering system of claim 11, wherein the plurality of unit cells are arranged two-dimensionally.

13. The laser beam steering system of claim 12, wherein the plurality of unit cells are configured to steer the laser beam by forming a refractive index profile that changes with time.

14. The laser beam steering system of claim 11, further comprising an insulating layer provided between the refractive index conversion layer and the at least one antenna pattern.

* * * * *